United States Patent
Iwai

(10) Patent No.: US 6,836,802 B1
(45) Date of Patent: Dec. 28, 2004

(54) NETWORK MANAGEMENT SYSTEM USES PROXY AGENT FOR COMMUNICATING CONTROL INFORMATION AND EVENT NOTIFICATIONS BETWEEN NETWORK MANAGEMENT APPARATUS AND AGENTS NOT DIRECTLY CONNECTED TO A NETWORK

(75) Inventor: Kazuhiro Iwai, Tokyo (JP)

(73) Assignee: NEC Corporation, Tokyo (JP)

( * ) Notice: Subject to any disclaimer, the term of this patent is extended or adjusted under 35 U.S.C. 154(b) by 763 days.

(21) Appl. No.: 09/710,907

(22) Filed: Nov. 14, 2000

(30) Foreign Application Priority Data

Nov. 16, 1999 (JP) .......................................... 11-324958

(51) Int. Cl.[7] .............................................. G06F 15/173
(52) U.S. Cl. ........................ 709/224; 709/238; 709/225
(58) Field of Search ................................ 709/224, 238, 709/225, 223, 202, 220; 345/734

(56) References Cited

U.S. PATENT DOCUMENTS

| | | | |
|---|---|---|---|
| 5,651,006 A | | 7/1997 | Fujino et al. |
| 5,987,514 A | * | 11/1999 | Rangarajan ................. 709/224 |
| 5,996,010 A | * | 11/1999 | Leong et al. ................ 709/223 |
| 5,999,179 A | * | 12/1999 | Kekic et al. ................. 345/734 |
| 6,085,222 A | * | 7/2000 | Fujino et al. ................ 709/202 |
| 6,145,001 A | * | 11/2000 | Scholl et al. ................ 709/223 |
| 6,199,109 B1 | * | 3/2001 | Reder et al. ................. 709/224 |
| 6,654,796 B1 | * | 11/2003 | Slater et al. ................. 709/220 |

FOREIGN PATENT DOCUMENTS

| | | |
|---|---|---|
| JP | 7-226777 | 8/1995 |
| JP | 7-334445 | 12/1995 |
| JP | 9-93265 | 4/1997 |
| JP | 9-331325 | 12/1997 |
| JP | 11-205320 | 7/1999 |

* cited by examiner

*Primary Examiner*—Le Hien Luu
(74) *Attorney, Agent, or Firm*—Foley & Lardner LLP

(57) ABSTRACT

A configuration of a network management system capable of readily managing a plurality of agents having respective addresses, directly connecting the respective agents to a network without changing interfaces, and providing an agent connected singly to the network as a representative of the rest agents within the same node to a network management apparatus without changing interfaces is provided. In the network management system, agents 40, 50 and 60 are allocated different addresses which are unique worldwide and interconnected in node 10, agent 40 is directly connected to network 30, agents 40 to 60 are interconnected through interfaces similarly to network 30, and agents 40 to 60 are managed by network management apparatus 20 connected through network 30.

9 Claims, 3 Drawing Sheets

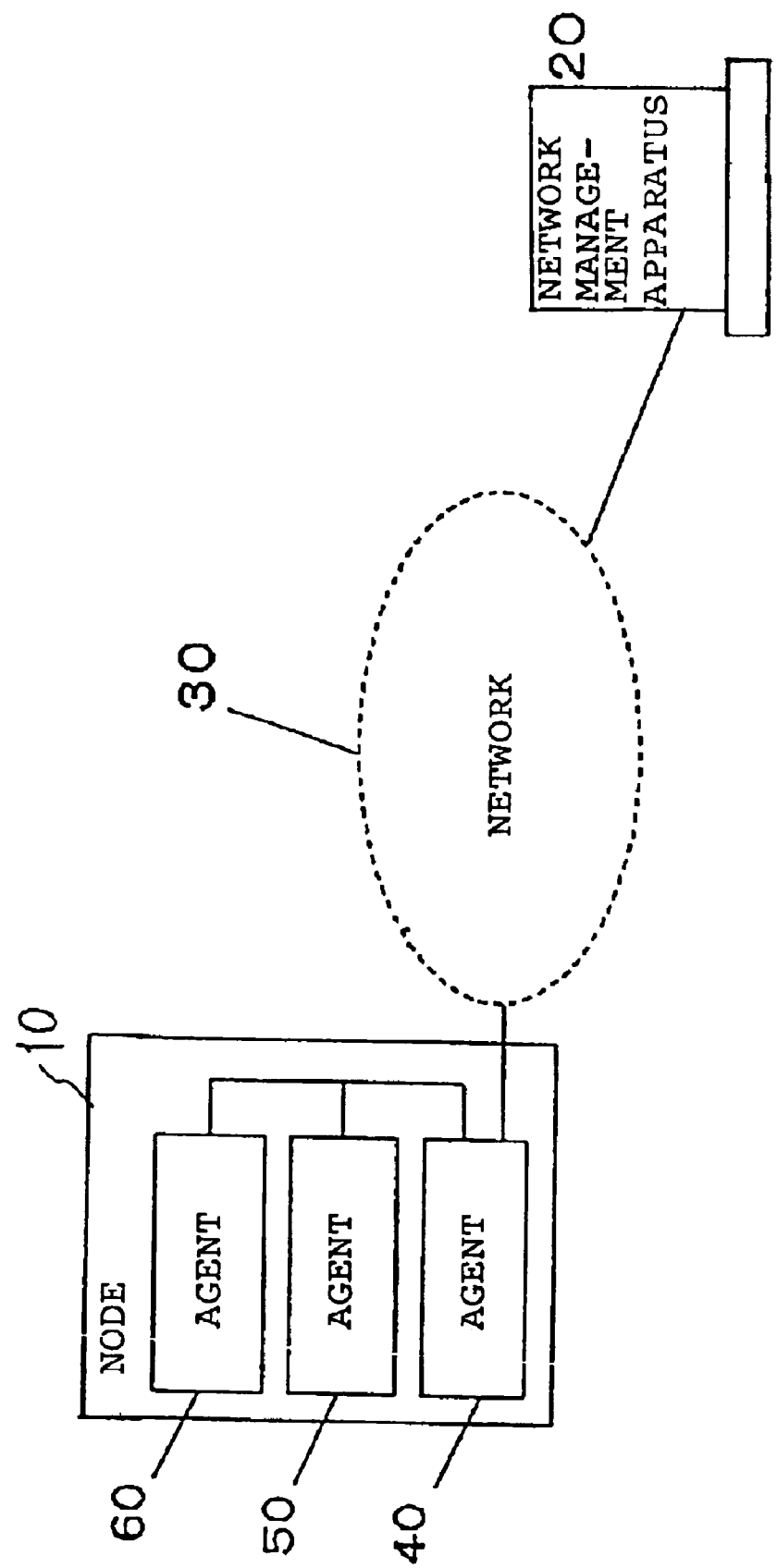

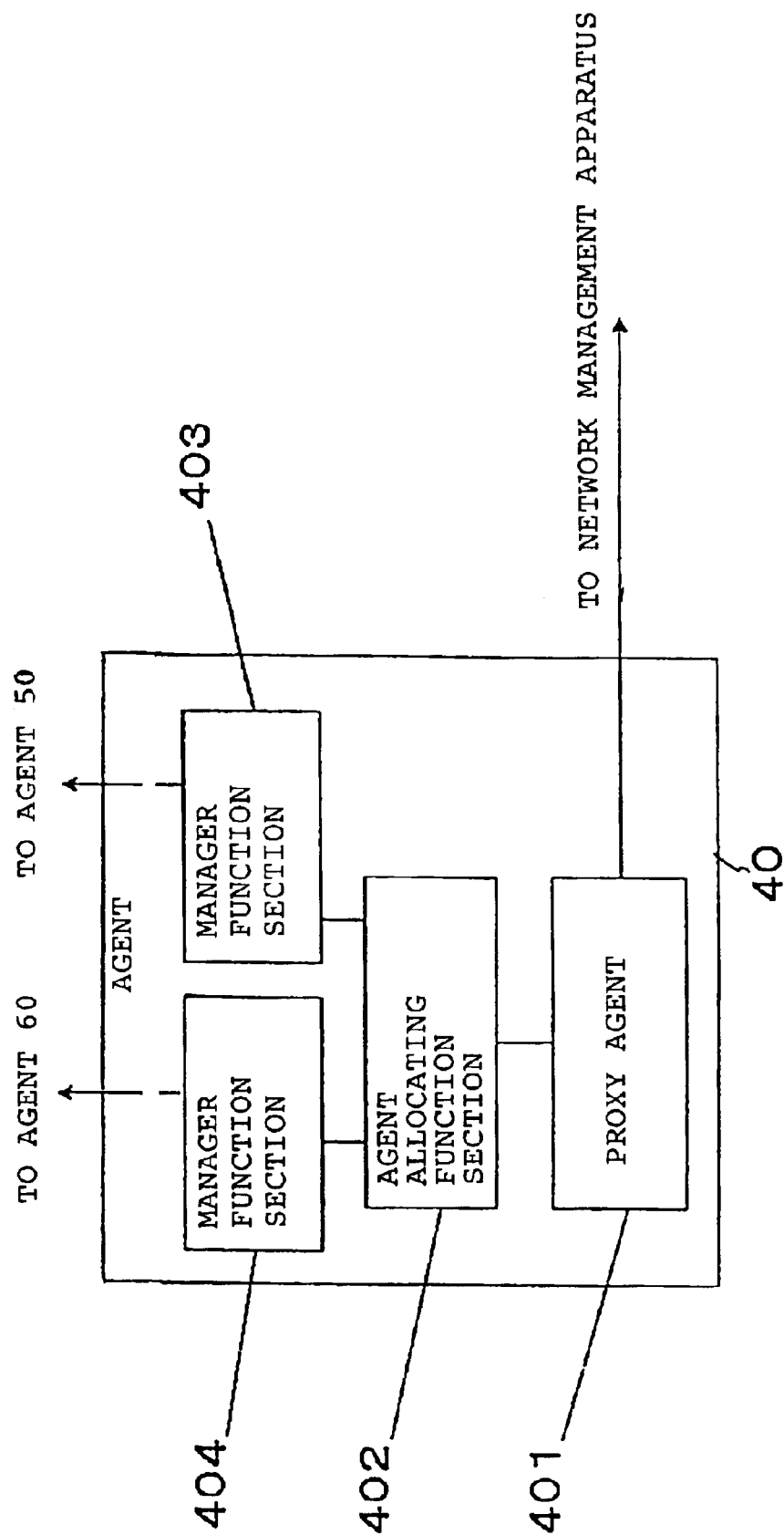

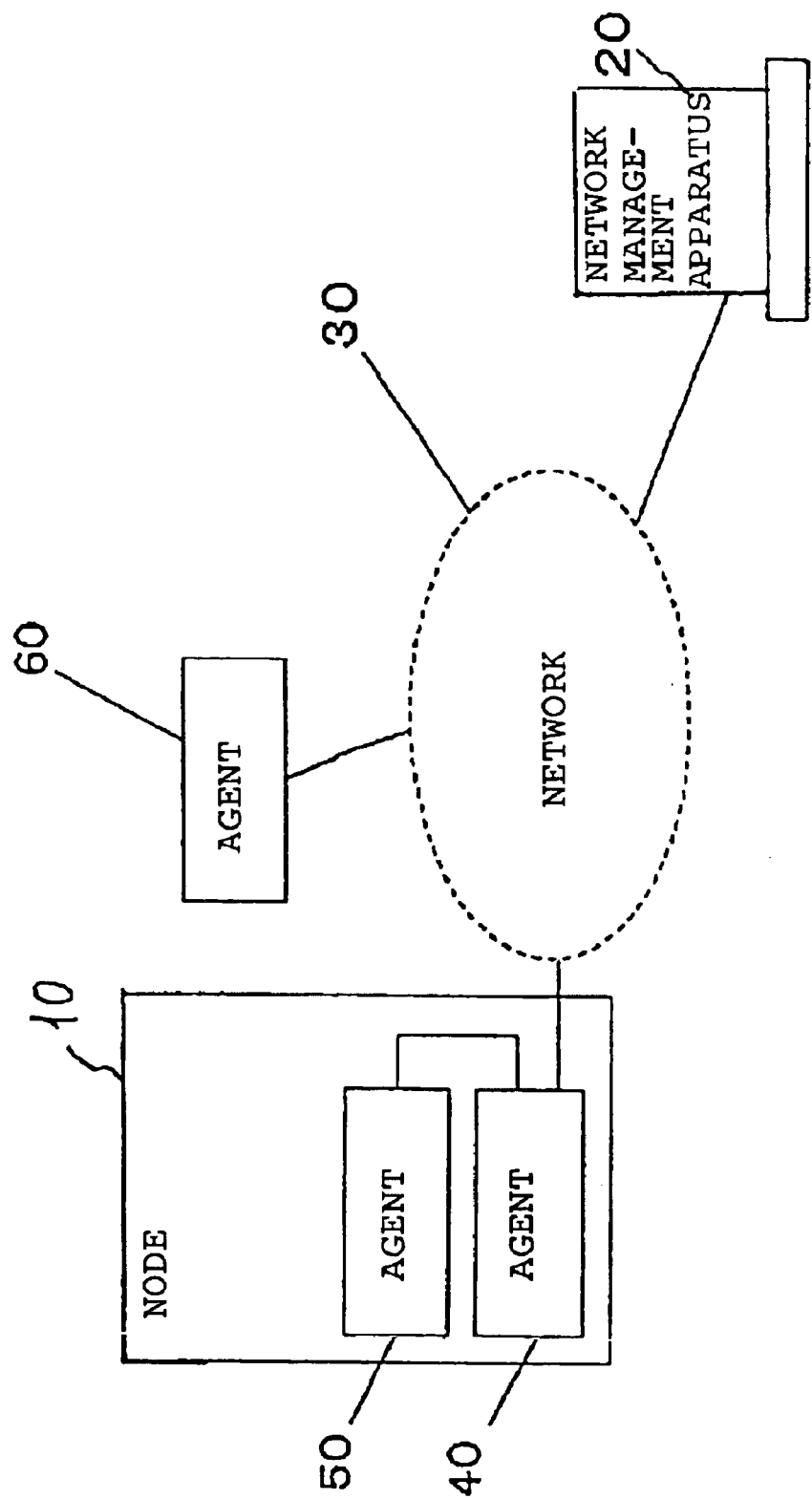

NETWORK MANAGEMENT SYSTEM USES PROXY AGENT FOR COMMUNICATING CONTROL INFORMATION AND EVENT NOTIFICATIONS BETWEEN NETWORK MANAGEMENT APPARATUS AND AGENTS NOT DIRECTLY CONNECTED TO A NETWORK

BACKGROUND OF THE INVENTION

1. Field of the Invention

The present invention relates to a network management system and a method of network management appropriate for managing agents which have respective addresses.

2. Description of the Related Arts

In conventional network management systems, network component units communicate directly with a management terminal for managing the units using a network management protocol such as an SNMP (Simple Network Management Protocol).

In such a network management system using the SNMP, it is necessary to provide each network component unit to be managed with a function to be managed (SNMP Agent function) and with an IP address as an identifier in a network layer required for communication with a management terminal.

This IP address needs to be unique worldwide, and is actually used as an identifier of a network component unit on a network to which a management terminal serving as a network management apparatus is connected.

As such a network management scheme, in Japanese Patent Laid-open No.9-331325, for example, a plurality of network component units each having a function to be managed form a monitor network, a managing terminal in an IP network including the management terminal provided therein monitors each network component unit on the monitor network, and a substitute reply device is provided at the connecting point between the monitor network and the IP network.

The connecting portion of the substitute reply device to the IP network is provided with an IP address which is unique worldwide. In addition, the connecting portion of the substitute reply device to the monitor network is provided with an IP address which is unique within the monitor network.

The substitute reply device performs conversion of a management identification element for identifying each network component unit by a management terminal and an IP address provided for each network component unit, and conversion of management items in the monitor network.

In the aforementioned prior art, however, each network component unit has an address within the monitor network different from an IP address which is unique worldwide, and the substitute reply device converts a message provided from the management terminal. Thus, the management terminal cannot manage each network component unit which is in direct connection with the IP network.

When an attempt is made to use a singly existing node as a network component unit as it is, an associated interface need be changed.

In addition, when a plurality of network component units having respective network addresses exist within the same node, a problem of complicated management of the network component units occurs since a management terminal controls them as independent nodes in the network.

SUMMARY OF THE INVENTION

The present invention provides a network management system and a method of network management which is capable of managing a plurality of agents having respective addresses, directly connecting the respective agents to a network without changing interfaces, and including an agent connected singly to the network into a node without changing interfaces.

It is a first object of the present invention to form a network management system comprising a node in which a plurality of agents, first to nth agents, having worldwide unique respective addresses are interconnected; a network management apparatus for managing the first to nth agents; and a network for connecting the network managing apparatus to the node, wherein the first agent is directly connected to the network, and the first to nth agents are interconnected through interfaces similar to the network.

The first agent comprises a proxy agent for receiving control information provided from the network management apparatus to the node and sending a response to the control information and notification of events from the node to the network management apparatus, an agent allocating function section for recognizing which agent the control information is intended for and allocating the control information to the intended agent, a first manager function section for managing the second agent based on the allocated control information, and an i–1 manager function section for managing an ith agent based on the allocated control information.

When a mode is intended to set in a specific agent of the second to nth agents, the network management apparatus produces a packet including an address for identifying the intended agent, a type of a mode and contents to be set, and transmit the packet to the network addressing the first agent.

When all traffic information is required to collect from the first to nth agents, the network management apparatus produces a packet for requesting all traffic information collection and transmit the packet, to the network addressing the first agent.

When one of the second to nth agents is connected solely to the network, the network management apparatus may identify the address of the agent to allow individual management independently of the node.

It is a second object of the present invention to disclose a method of network management comprising: a first step of providing first to nth agents with different addresses which are unique worldwide and interconnecting the agents to a node; a second step of connecting the first agent directly to a network; a third step of interconnecting the first to nth agents through interfaces similar to the interfaces employed to the network; a fourth step of managing the first to nth agents by a network management apparatus; and a fifth step of connecting the network management apparatus to the node through the network.

The second step includes a sixth step of receiving control information provided from the network management apparatus to the node and sending a response to the control information and notifying of events from the node to the network management apparatus, a seventh step of recognizing which agent the control information is intended for and allocating the control information to the intended agent, and an eighth step of managing an ith agent based on the allocated control information.

The fourth step includes a ninth step of, when a mode is required to set in a specific agent of the second to nth agents, producing a packet including an address for identifying the specific agent, a type of a mode and contents to be set, and a tenth step of transmitting the packet to the network addressing the first agent.

The fourth step includes an eleventh step of, when all traffic information is required to collect from the first to nth agents, producing a packet for requesting to collect all traffic information, and a twelfth step of transmitting the packet to the network addressing the first agent.

The fourth step includes a thirteenth step of, when one of the second to nth agents is connected solely to the network, identifying the address of the solely connected agent to manage the agent by the network management apparatus independently from the node.

In the network management system and the method of network management according to the present invention, the first to nth agents are provided with different addresses which are unique worldwide and interconnected to the node, the first agent is directly connected to the network, the first to nth agents are interconnected through interfaces which are similar interfaces employed in the network, so that each of the first to nth agents can be managed directly by the network management apparatus connected through the network independently from the node.

BRIEF DESCRIPTION OF THE DRAWINGS

FIG. 1 is a block diagram showing an embodiment of a network management system of the present invention;

FIG. 2 is a detailed block diagram of an agent shown in FIG. 1; and

FIG. 3 is a block diagram illustrating a case where an agent connected to a node in FIG. 1 is connected singly to a network.

DESCRIPTION OF THE PREFERRED EMBODIMENT

A preferred embodiment of the present invention is hereinafter described.

FIG. 1 is a block diagram showing an embodiment of a network management system of the present invention, FIG. 2 is a detailed block diagram of an agent shown in FIG. 1, and FIG. 3 is a block diagram illustrating a case where an agent provided in a node in FIG. 1 is connected singly to a network.

The network management system shown in FIG. 1 is configured such that network management apparatus 20 and node 10 are connected to network 30. Node 10 is connected to agents 40, 50 and 60 serving as first to third agents, respectively. Agents 40 to 60 are provided with different addresses which are unique worldwide.

Agent 40 is directly connected to network 30.

Agents 40 to 60 are interconnected through interfaces similar to interfaces in network 30.

As shown in FIG. 2, agent 40 comprises proxy agent 401, agent allocating function section 402, manager function sections 403 and 404.

Proxy agent 40]. receives control information provided from network management apparatus 20 and sends a response to the control information and notification of events to network management apparatus 20. Agent allocating function section 402 determines which agent is being addressed by the control information received from network management apparatus 20, and allocates the information to manager function section 403 or 404 for providing for respective agent. Manager function section 403 serving as a first manager function section controls agent 50. Manager function section 404 serving as a second manager function section controls agent 60.

Next, description is made for the operation of the network management system with such a configuration.

First, it is assumed that address A20 is allocated for network management apparatus 20, and address A40 for agent 40, address A50 for agent 50, and address A60 for agent 60. These addresses A20, A40, A50 and A60 are unique addresses worldwide, respectively.

Agent 40 within node 10 previously recognizes that address A50 belongs to agent 50 and address A60 belongs to agent 60. Network management apparatus 20 recognizes address A40 of agent 40 as an address set for transferring control information to node 10.

When network management apparatus 20 sets, for example, a mode in agent 50, it produces a packet including information for identifying agent 50, a type of a mode to be set and setting contents, provides the packet with address A40 of agent 40, and transmits it to network 30.

When agent 40 receives control information provided from network 30, proxy agent 401 in agent 40 analyzes the control information and transfers the control information from network 30 to agent allocating function section 402 after recognized information from the analysis is added thereto.

Agent allocating function section 402 recognizes the intended mode setting in agent 50 from the identification information, and transfers the control information to manager function section 403. Manager function section 403 produces a packet including the types of the mode to be set and the setting contents in accordance with the control information provided from network management apparatus 20 through agent allocating function section 402, and transfers the packet to agent 50 after address A50 of agent 50 is entered therein.

Agent 50 sets the mode based on the provided information (packet) and sends the setting result back to manager function section 403 in agent 40. Manager function section 403 transfers the setting result provided from agent 50 to proxy agent 401 through agent allocating function section 402.

Proxy agent 401 notifies the mode setting result transferred from agent 50 to network management apparatus 20 through network 30. Network management apparatus 20 recognizes the mode setting result.

Next, when network management apparatus 20 attempts to collect all traffic information in node 10, it produces a packet for requesting all traffic information, and transfers it to network 30 after entering address A40 of agent 40 therein.

When agent 40 receives control information from network management apparatus 20, proxy agent 401 recognizes the need to request agents 50 and 60 to collect traffic information to collect all traffic information in the node.

Agent allocating function section 402 then requests both manager function sections 403 and 404 to collect traffic information.

Manager function section 403 produces a packet for requesting traffic collection, and transfers it to agent 50 after address A50 of agent 50 is entered therein. Agent 50 recognizes from the notified information that traffic information should be read, then reads intended information, and sends it back to manager function section 403.

Manager function section 403 transfers the traffic information received from agent 50 to proxy agent 401 through agent allocating function section 402.

Similarly, manager function section 404 produces a packet for requesting traffic collection and transfers it to agent 60 after address A60 of agent 60 is entered therein. Agent 60 recognizes from the notified information that traffic information should be read, then reads intended traffic information, and sends it back to manager function section 404. Manager function section 404 transfers the traffic information from agent 60 to proxy agent 401 through agent allocating function section 402.

Proxy agent 401 reads traffic information of agent 40, reads the traffic information of agents 50 and 60 provided through manager function sections 403 and 404, and combines and transfers the read traffic information to network management apparatus 20 through network 30.

Network management apparatus 20 recognizes the provided traffic information as traffic information of node 10.

Thereafter, when agent 60 is singly connected to network 30 as shown in FIG. 3, network management apparatus 20 can identify address A60 of agent 60 to control agent 60 independently of node 10.

In this manner, in the embodiment, agents 40 to 60 are provided with different addresses which are unique worldwide and connected to node 10, agent 40 is directly connected to network 30, agents 40 to 60 are interconnected through the interfaces similarly to network 30, and agents 40 to 60 are controlled by network management apparatus 20 connected through network 30.

Thus, since agent 40 in node 10, for example, identifies, as a representative of all agents 40 to 60, which agent of agents 40 to 60 the provided information is intended for, network management apparatus 20 can consider node 10 as one agent, thereby making it possible to readily manage a plurality of agents 40 to 60 having addresses individually.

Since a standard interface is used as the interfaces between proxy agent 401 in agent 40 and other agents 50 and 60, respective agents 40 to 60 can be directly connected to network 30 without changing the interfaces. As a result, it is possible to connect respective agents 40 to 60 directly to network 30 without changing the interfaces and to connect agent 60 connected solely to network 30 to agents 50 and 40 as the same node without changing the interfaces.

In addition, since agent 60 is directly connected to network 30, network managing apparatus 20 can mange agent 60 independently of node 10 by identifying address A60 of agent 60.

While the embodiment describes three agents 40 to 60, it goes without saying that two or less agents may be used, or four or more agents may be used.

As described above, according to the network management system and the method of network management of the present invention, the first to third agents are supplied with different addresses which are unique worldwide and provided in the node, the first agent is directly connected to the network, the first to third agents are interconnected through the interfaces similarly to the network, and the first to third agents are managed by the network management apparatus connected through the network. Thus, it is possible to readily mange a plurality of agents having addresses individually, to connect the respective agents directly to the network without changing the interfaces, and to handle the agent solely connected to the network as the same node without changing the interfaces.

What is claimed is:

1. A network management system comprising:
   at least one node to which first and nth agents are connected serving as network component units and having different addresses which are unique worldwide;
   a network management apparatus for managing said first to nth agents; and
   a network for connecting said network managing apparatus to said node,
   wherein said first agent is directly connected to said network, and said first to nth agents are interconnected each through a similar interface which is employed to connect an agent to said network; and
   wherein said first agent comprises:
   a proxy agent for receiving control information provided from said network management apparatus and sending a response to said control information and notification of events to said network management apparatus;
   an agent allocating function section for recognizing which agent said control information is intended for and allocating said control information to the intended agent; and
   a first manager function section for managing said second agent based on said allocated control information, and
   an i–1 manager function section for managing an ith agent based on said allocated control information where i is an integer greater than or equal to 3.

2. The network management system according to claim 1, wherein said network management apparatus comprises:
   means for producing a packet including control information and an address for identifying an intended agent to execute the control information when required;
   means for transmitting said packet to the network addressing the first agent.

3. The network management system according to claim 2, said control information is a mode setting.

4. The network management system according to claim 2, said control information is to collect all traffic information in the node.

5. The network management system according to claim 1, wherein the network management apparatus comprises:
   means for managing an agent independently from the node by identifying the address of the agent when the agent is connected solely to said network free from the relation of the first agent.

6. A method of network management comprising:
   a first step of providing first to nth agents with different addresses which are unique worldwide and interconnecting said agents within a node;
   a second step of connecting said first agent directly to a network;
   a third step of interconnecting said first to nth agents through interfaces which are similar to the interfaces employed for said network;
   a fourth step of managing said first to nth agents by a network management apparatus; and
   a fifth step of connecting said network management apparatus to said node through said network; and
   further comprising:
   a sixth step of receiving control information in a proxy agent formed within said first agent, said control information provided from said network management apparatus and sending a response to said control information and notification of events to said network management apparatus;
   a seventh step of recognizing within an agent allocation function section of said proxy agent which agent said control information is intended for and allocating said control information to the intended agent by means of one of a plurality of message function sections contained within said first agent; and an eighth step of managing the intended agent of said second to nth agents based on said allocated control information transmitted to the intended agent by the manager function section.

7. The method of network management according to claim 6, wherein said fourth step includes:

a ninth step of, when a mode is set in one of said second to nth agents, producing a packet including an address for identifying the one of said second to nth agents, a type of a mode and contents to be set; and a tenth step of transmitting said packet to said network addressing said first agent.

8. The method of network management according to claim 6, wherein said fourth step further includes:

an eleventh step of, when all traffic information is required to collect from said first to nth agents, producing a packet for requesting to collect all traffic information; and a twelfth step of transmitting said packet to the network addressing said first agent.

9. The method of network management according to claim 6, wherein said fourth step includes:

a thirteenth step of, when one of said second to nth agents is connected solely to said network, being identified the address of said agent and managed by the network management apparatus independently from said node.

* * * * *